(12) United States Patent
Ishida et al.

(10) Patent No.: US 6,478,471 B2
(45) Date of Patent: Nov. 12, 2002

(54) WHEEL-SUPPORT ROLLING BEARING UNIT AND A METHOD MANUFACTURING THE SAME

(75) Inventors: Hirohide Ishida, Kanagawa (JP); Hiroya Miyazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 71 days.

(21) Appl. No.: 09/737,462

(22) Filed: Dec. 18, 2000

(65) Prior Publication Data

US 2002/0012486 A1 Jan. 31, 2002

(30) Foreign Application Priority Data

Dec. 16, 1999 (JP) .............................. 11-357073
Dec. 20, 1999 (JP) .............................. 11-360633
Nov. 28, 2000 (JP) .............................. 2000-360612

(51) Int. Cl.[7] .............................................. F16C 43/00
(52) U.S. Cl. ...................... 384/537; 384/544; 384/913
(58) Field of Search ................................ 384/544, 589, 384/537, 585, 912, 913

(56) References Cited

U.S. PATENT DOCUMENTS

| | | | |
|---|---|---|---|
| 4,893,960 A | 1/1990 | Beier et al. | 403/24 |
| 5,596,798 A | 1/1997 | Hofmann et al. | 29/724 |
| 5,911,458 A | 6/1999 | Bywalez et al. | 29/898.062 |
| 6,113,279 A | 9/2000 | Sawai et al. | 384/537 |

FOREIGN PATENT DOCUMENTS

| | | | |
|---|---|---|---|
| JP | 10-95203 | 4/1998 | B60B/35/18 |
| JP | 11-129703 | 5/1999 | B60B/35/18 |

*Primary Examiner*—Lenard A. Footland
(74) *Attorney, Agent, or Firm*—Sughrue Mion, PLLC

(57) ABSTRACT

A cylindrical portion 10 is not quenched, and its hardness of a cylindrical portion 10 is set at Hv200 to 300. An average cross sectional area of the crystal particle in this portion is set to be within 0.3 mm². Accordingly, when a caulking portion is formed by expanding the cylindrical portion 10*b* to an inner ring 3 to a hub 2*b* made of carbon steel, cracks or the like are not formed in the resultant caulking portion.

8 Claims, 11 Drawing Sheets

WHEEL-SUPPORT ROLLING BEARING UNIT AND A METHOD MANUFACTURING THE SAME

BACKGROUND OF THE INVENTION

The present invention relates to a wheel-support rolling bearing unit, which is used for rotatably supporting vehicle wheels on suspension devices, and also a method for manufacturing the same.

The vehicle wheels are supported on the suspension devices by the wheel-support rolling bearing unit. A wheel-support rolling bearing unit is known which structured not using nuts for firmly coupling the hub and the inner ring for the purposes of cost reduction by reducing the number of the number of components parts, and the size and weight reduction, as disclosed in Japanese Patent Unexamined Publication No. Hei.11-129703. FIGS. 4 through 6 show the wheel-support rolling bearing unit 1 disclosed in the publication.

The conventional wheel-support rolling bearing unit 1 includes a hub 2, an inner ring 3, an outer ring 4, and a plurality of rolling elements 5. A first flange 6 for supporting the wheel is formed at a portion of the hub 2 which is located closer to the outer end of its outer peripheral surface (the word "outer side or outside" means the outer side of the vehicle body as viewed in the widthwise direction in a state that the unit is assembled into the motor vehicle, and the left side in those figures except FIGS. 3 and 7. The word "inner side or inside" means locations closer to the center of the vehicle body as viewed in the widthwise direction, and the right side in those figures except FIGS. 3 and 7.). A first inner raceway 7 is formed in the outer surface of a middle portion of the hub 2, and a stepped part 8 whose outside diameter is small is formed at the inner end thereof. The inner ring 3 is fit to the stepped part 8 and fastened by a caulking portion 9. The first inner raceway 7 is formed directly in the outer surface of the middle portion of the hub 2, and sometimes is formed in the outer surface of a separate inner ring fit to the middle portion of the hub. In the later case, a portion of the end of the hub 2, which is protruded to the inner side as viewed in the axial direction beyond the separate inner ring, serves as the stepped part which receives the inner ring 3.

To this end, a cylindrical portion 10, which is used for forming the caulking portion 9, is formed in the inner end of the hub 2. A thickness of the cylindrical portion 10 becomes small toward its top end before the cylindrical portion 10 shown in FIG. 6 is expanded, for caulking, outward in the diameter directions. Accordingly, a tapered hole 11 is formed in the inner end face of the hub 2. The inside diameter of the tapered hole becomes small toward a recess.

To expand, for caulking, the top end of the cylindrical portion 10 in order to fasten the inner ring 3 to the inner end of the hub 2, a force piston 12 is forcibly pressed against the top end of the cylindrical portion 10 in a state that the hub 2 is fixed so as not to shift in the axial direction, as shown in FIG. 5. An outward curved portion 13, shaped like a truncated cone, which may be thrust into the cylindrical portion 10, is formed in the central portion of the end surface (left end surface in FIG. 5) of the force piston 12. An inward curved portion or recess 14 is formed surrounding the outward curved portion 13. A cross section of the recess 14 is configured to have a complex curved surface whose radius of curvature becomes small toward the outside so that a cross section of the caulking portion 9, which is formed by plastically forming the top end of the cylindrical portion 10 by the recess 14, gradually reduces in size from the base end to the top end, and abruptly reduces at the top end.

By pressing the force piston 12 having the outward curved portion 13 and the recess 14, which are shaped and have dimensions as mentioned above, against the top end of the cylindrical portion 10, the top end of the cylindrical portion 10 is forcibly expanded outward in the diameter directions for caulking, to thereby form the caulking portion 9. The inner ring 3 is firmly held between the caulking portion 9 and a step surface 23 of the stepped part 8 formed at the inner end of the hub 2, whereby the inner ring 3 is fastened to the hub 2.

A first outer raceway 15 and a second outer raceway 17 are formed in the inner surface of the outer ring 4. The first outer raceway 15 is formed in the outer peripheral surface of the middle portion of the hub 2, while being confronted with the first inner raceway 7. The second outer raceway 17 is formed while being confronted with a second inner raceway 16 formed in the outer peripheral surface of the inner ring 3. A plurality of rolling elements 5, while being rollably held within an element holder 18, are located between the first inner raceway 7 and the first outer raceway 15. A plurality of rolling elements 5, while being rollably held within an element holder 18, are located between the second inner raceway 16 and the element holder 18. In the illustrated instance, the rolling elements 5 are balls; however, in the case of the wheel-support rolling bearing unit for motor vehicles which is heavy, those may be tapered rollers.

To assemble the wheel-support rolling bearing unit 1 into the motor vehicle, the outer ring 4 is fixed to a suspension device with a second flange 19 formed on the outer peripheral surface of the outer ring 4, and the wheel is fixed to the first flange 6. As a result, the wheel is rotatably supported on the suspension device.

For a work to form the caulking portion 9 by plastically deforming (expanding for caulking) the cylindrical portion 10 in order to form the wheel-support rolling bearing unit 1 thus constructed and operated, it is preferable to use a swing press 20 as shown in FIG. 7. The swing press 20 is made up of a force piston 12, a holding tool 21 and a holder 22. In forming the caulking portion 9 by expanding for caulking the cylindrical portion 10, the force piston 12 is displaced in a swing manner while pushing upward the hub 2 with the aid of the holder 22. In a state that the center axes of the force piston 12 and the hub 2 are inclined at an angle θ with respect to each other, the force piston 12 is turned about the center axis of the hub 2, while being in contact with each other. In forming the caulking portion 9 by the swing press as just-mentioned, a part of the circumference of the force piston 12 is pressed against the cylindrical portion 10, so that the caulking expanding work of the caulking portion 9 continuously progresses in part in the circumferential direction. For this reason, in forming the caulking portion 9 by ordinary forging process, a load acting on the cylindrical portion 10 may be reduced during the forging process. The holding tool 21 prevents the inner ring 3 and the hub 2 from moving in the radial direction during the caulking expanding work of the caulking portion 9 by the force piston 12.

A technique that in the above structure, a portion of the outer peripheral surface of the hub 2, cross hatched in FIG. 4, is quenched to be hardened to improve the durability thereof, is also disclosed in the Japanese Patent Unexamined Publication No. Hei. 11-129703. Specifically, the first inner raceway 7 portion, the base end portion of the first flange 6, and the half of the base end portion of the stepped part 8 are quenched to increase hardness of those portions to about Hv550 to 900. On the other hand, the hardness of the cylindrical portion 10 which will form the caulking portion 9 is decreased to about Hv200 to 300 so that the cylindrical portion is easy to be plastically deformed.

Of those cross hatched portions to be quenched, the first inner raceway 7 portion receives a great surface pressure upon contact of it with the rolling surfaces of the rolling elements 5. Accordingly, it is hardened order to secure a rolling fatigue lifetime. The base end portion of the first flange 6 is hardened in order to prevent the base end portion from being deformed independently of a moment load receiving from the first flange 6 to which the wheel is fastened. The half of the base end portion of the stepped part 8 is hardened in order to prevent the outer peripheral surface of the stepped part 8 from being deformed independently of a fitting pressure of the inner ring 3 and a radial load that the inner ring 3 receives from the plurality of rolling elements 5, or to prevent the fretting from occurring on the outer peripheral surface of the stepped part 8 where it receives the inner ring 3 fit thereto. The step surface 23 portion of the stepped part 8 is hardened in order to prevent the step surface 23 from being deformed independently of an axial directional load acting on the inner ring 3 by caulking work to be described later, to prevent the fretting from occurring on the step surface 23 as a contact surface where it comes in contact with the outer end surface of the inner ring 3, and to prevent a corner R as a continuous portion where the outer peripheral surface of the stepped part 8 continues to the step surface 23 from being deformed as the result of the stress concentrated thereto.

In a Japanese Patent Unexamined Publication No. Hei.10-95203, as shown in FIG. 8, the outside diameter of a portion of the inner end of the hub 2a, which is protruded beyond the fitting portion of the inner ring 3, is somewhat smaller than the outside diameter of the fitting portion. Specifically, a stepped part 25 having a height H of about 0.02 to 1 mm is formed on the outer peripheral surface of the base end of the cylindrical portion 10a formed on the inner end of the hub 2a at a location closer to the second inner raceway 16 than a slanted surface 24, which is formed at the inner end opening of the inner ring 3. The slanted surface 24 is held down by expanding radially outwardly the diameter-reduced portion of the cylindrical portion 10a for caulking. When the cylindrical portion 10a is radially outwardly expanded for caulking, the bending of it starts at the stepped part 25. With provision of the expanding work, excessive force hardly applies to the cylindrical portion 10a during the caulking expanding work. As a result, the expanded portion for caulking is little damaged, for example, cracked.

The above-mentioned structure will possibly realize a small and light-weight wheel-support rolling bearing unit 1 at low cost. However, to secure the sufficient durability, reliability and cost reduction of the resultant product, it is necessary to increase the production yield by making the caulking portion 9 for fixing the inner ring 3 to the hub 2 (2a) free from damage, e.g., cracking.

SUMMARY OF THE INVENTION

Accordingly, an object of the present invention is to provide a wheel-support rolling bearing unit which can prevent the caulking portion from being damaged, for example, cracked, and realize sufficient cost reduction by the resultant increased production yield, and also to provide a method for manufacturing the same.

The above-mentioned object can be achieved by a wheel-support rolling bearing unit, according to the present invention, comprising:

an outer ring having first and second outer raceways formed on its inner peripheral surface;

a hub made of carbon steel, the hub having a flange formed on the outer peripheral surface of one end thereof, the hub having a first inner raceway which is disposed on its middle portion in an axial direction thereof and is confronted with the first outer raceway of the outer ring, the hub having a cylindrical portion which is disposed at the other end of the hub and has first and second portions, wherein an average cross sectional area of crystal particle in the second portion is less than 0.030 mm$^2$;

an inner ring provided at the other end of the hub, the inner ring having a second inner raceway which is formed on its outer peripheral surface and is confronted with the second outer raceway of the outer ring;

a plurality of first rolling elements located between the first inner raceway and the first outer raceway; and a plurality of second rolling elements located between the second inner raceway and the second outer raceway;

wherein a caulking portion, which is formed by plastically deforming the second portion of the cylindrical portion, is protruded beyond at least the inner ring fit to the hub, whereby the inner ring fit to the hub is firmly coupled to the hub.

In addition, the above-mentioned object can also be achieved by a method manufacturing a wheel-support rolling bearing unit, according to the present invention, comprising:

an outer ring having first and second outer raceways formed on its inner peripheral surface;

a hub made of carbon steel, the hub having a flange formed on the outer peripheral surface of one end thereof, the hub having a first inner raceway which is disposed on its middle portion in an axial direction thereof and is confronted with the first outer raceway of the outer ring, the hub having a cylindrical portion which is disposed at the other end of the hub;

an inner ring provided at the other end of the hub, the inner ring having a second inner raceway which is formed on its outer peripheral surface and is confronted with the second outer raceway of the outer ring;

a plurality of first rolling elements located between the first inner raceway and the first outer raceway; and a plurality of second rolling elements located between the second inner raceway and the second outer raceway;

the method comprising:

preparing a blank hub which has the cylindrical portion including first and second portions, wherein an average cross sectional area of crystal particle in the second portion is less than 0.030 mm$^2$; and forming a caulking portion by plastically deforming the second portion of the cylindrical portion, thereby coupling the inner ring with the hub firmly.

In the above-mentioned wheel-support rolling bearing unit or method, the hub may comprises:

a main body integrally formed with the flange portion; and a separate inner ring which has the first inner raceway and is fit to the main body.

In addition, in the above-mentioned invention, it is preferable that an average cross sectional area of the crystal particle in the second portion is less than 0.020 mm$^2$.

Further, in the above-mentioned invention, it is more preferable that an average cross sectional area of the crystal particle in the second portion is less than 0.0156 mm$^2$.

Furthermore, in the above-mentioned invention, it is advantageous that an average cross sectional area of the crystal particle in the second portion is less than 0.012 mm$^2$.

Further, the above-mentioned object can be achieved by a wheel-support rolling bearing unit, according to the present invention, comprising: a hub having a first flange formed on the outer peripheral surface of one end thereof, and a first inner raceway integrally or separately formed in the outer peripheral surface of a middle portion thereof; an inner ring, provided at the other end of the hub, having a second inner raceway formed on the outer peripheral surface; an outer ring having first and second outer raceways formed in the inner peripheral surface, the first outer raceway being confronted with the first inner raceway and the second outer raceway being confronted with the second inner raceway; and a plurality of rolling elements being located between the first inner raceway and the first outer raceway and a plurality of rolling elements being located between the second inner raceway and the second outer raceway; wherein by a caulking portion, which is formed by radially expanding for caulking a cylindrical portion formed at a portion of the other end of the hub, which is protruded beyond at least the inner ring fit to the hub, the inner ring fit to the hub is firmly coupled to the hub.

In the wheel-support rolling bearing unit thus constructed, the hub is made of carbon steel. An average cross sectional area of crystal particle in a portion of the cylindrical portion at which the cylindrical portion is plastically deformed (during the caulking portion forming work), is less than 0.030 mm$^2$. It is preferably less than 0.020 mm$^2$, more preferably less than 0.0156 mm$^2$, and further preferably less than 0.012 mm$^2$.

For the hub, carbon steel is used which contains 0.45 to 1.10 wt. % carbon when the first inner raceway is directly formed in the outer surface of the middle portion of the hub. For the hub, carbon steel is used which contains 0.20 to 1.10 wt. % carbon when the first inner raceway is formed in the outer peripheral surface of the inner ring, which is separate from the hub. Examples of such a carbon steel are S53C and S35C.

In the wheel-support rolling bearing unit thus constructed, the average cross sectional area of the crystal particle of the carbon steel, which makes the cylindrical portion, which will become the caulking portion, is selected to be within 0.030 mm$^2$. During the work to form the caulking portion by radially outwardly expanding the cylindrical portion, it is effectively prevented that the caulking portion is damaged or cracked. As a result, in the wheel-support rolling bearing unit of the invention, the production cost can be sufficiently reduced while securing the required durability and reliability.

Where the average cross sectional area of the crystal particle of the carbon steel, is within 0.030 mm$^2$, defects which is problematic in practical use will not be formed. When it is approximate to 0.030 mm$^2$, sometimes creases, which are negligible in practical use, are formed in the resultant wheel-support rolling bearing unit. When it is approximate to 0.020 mm$^2$, creases area also formed; however, the creases are much smaller and formation of them is more infrequent. When it is less than 0.0156 mm$^2$, creases are little formed. When it is less than 0.0120 mm$^2$, no or little crease is formed on the caulking portion.

DETAILED DESCRIPTION OF THE PREFERRED EMBODIMENTS

Figure 1:
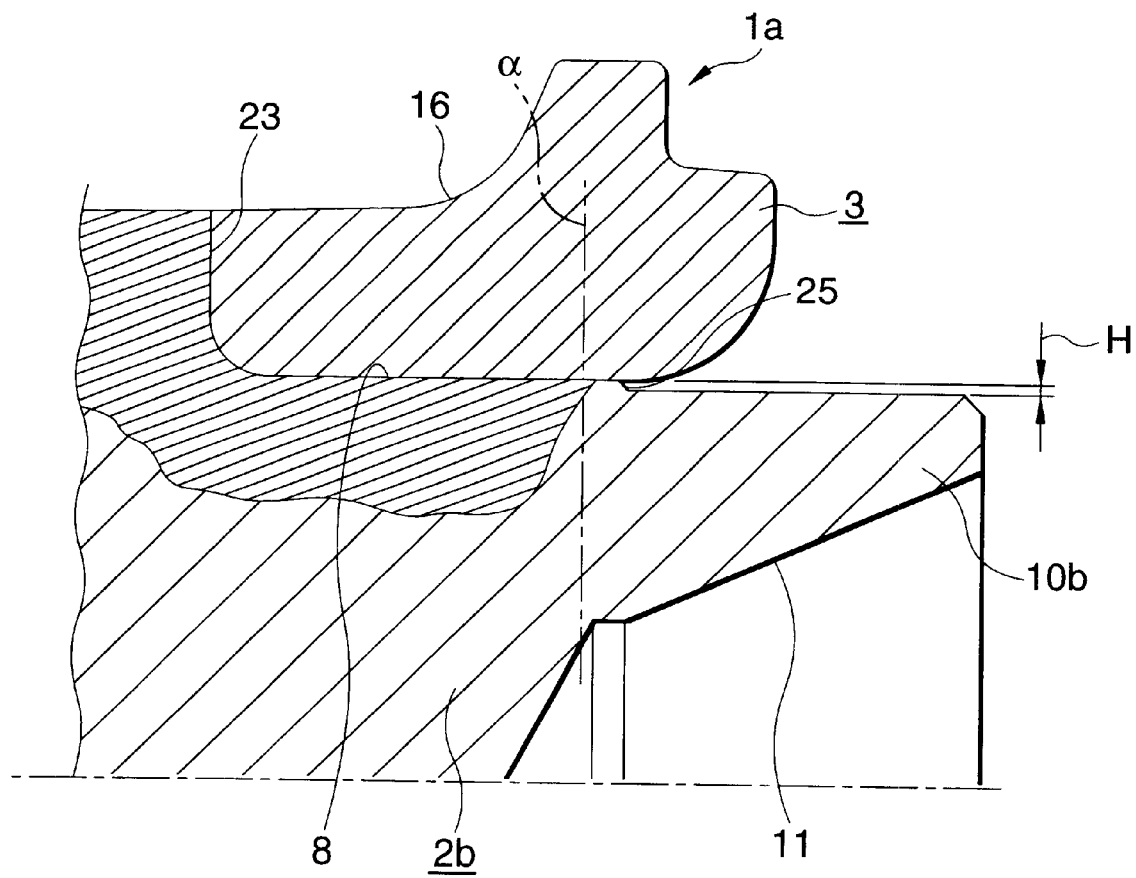
FIG. 1 is a cross sectional view showing a part of a wheel-support rolling bearing unit, which is an embodiment of the present invention, before the end of the hub is expanded for caulking.
Figure 2:
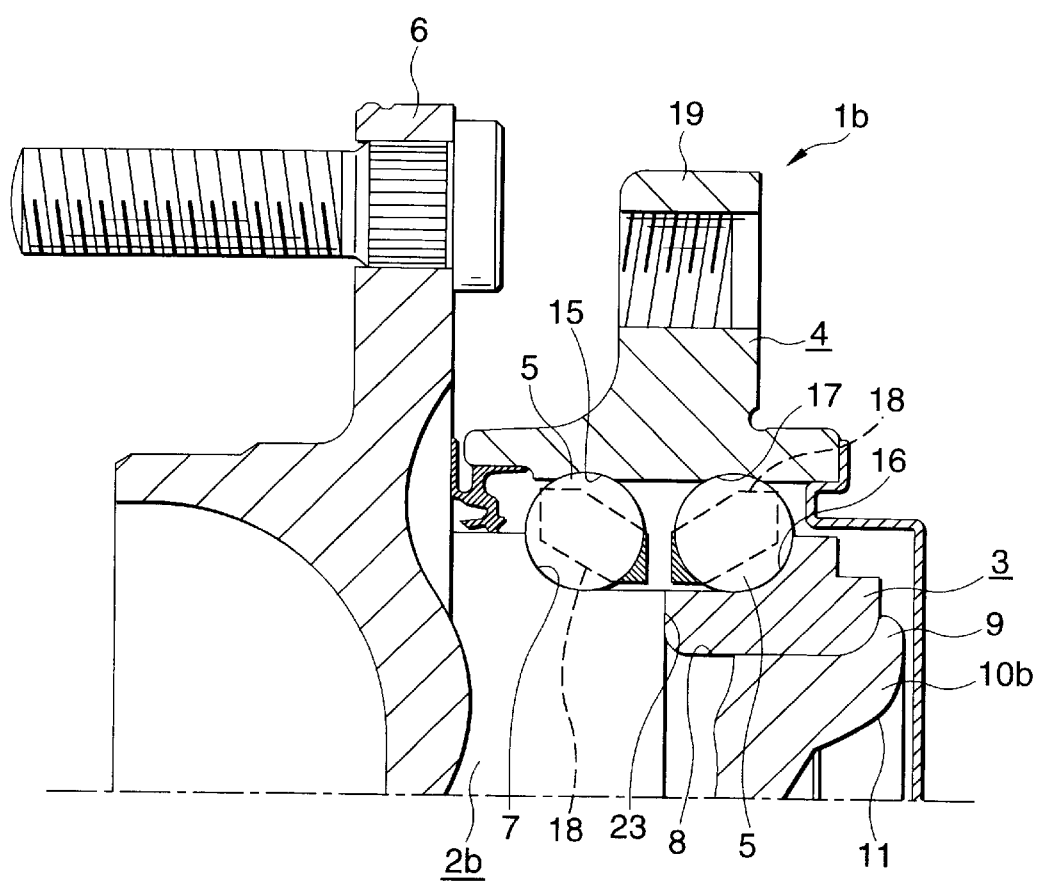
FIG. 2 is a cross sectional view showing a part of the wheel-support rolling bearing unit after its assembling is completed.
Figure 3A:
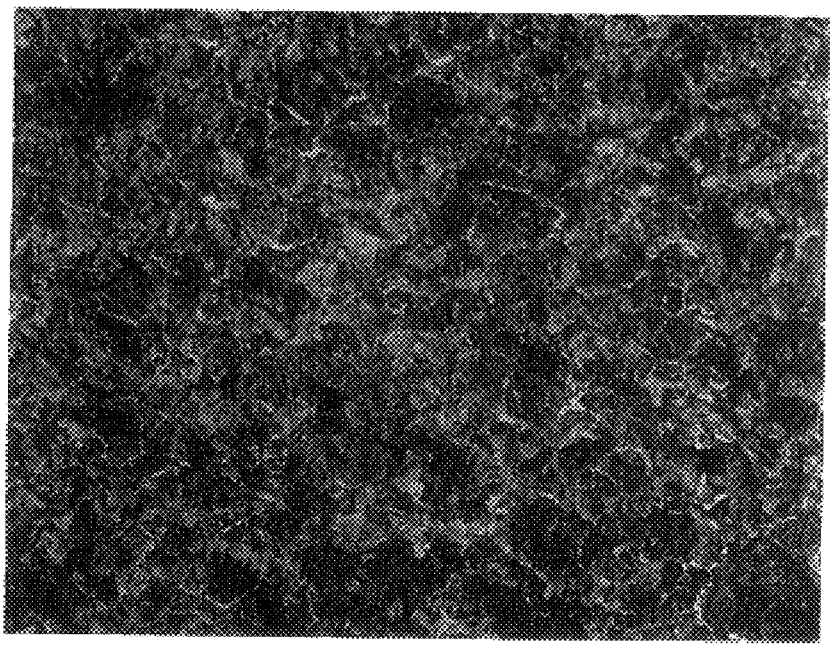
FIG. 3 is a diagram showing micrographs of two cases, one case in which the average cross sectional area of the crystal particle is small, and the other case in which its cross sectional area is large.
Figure 3B:
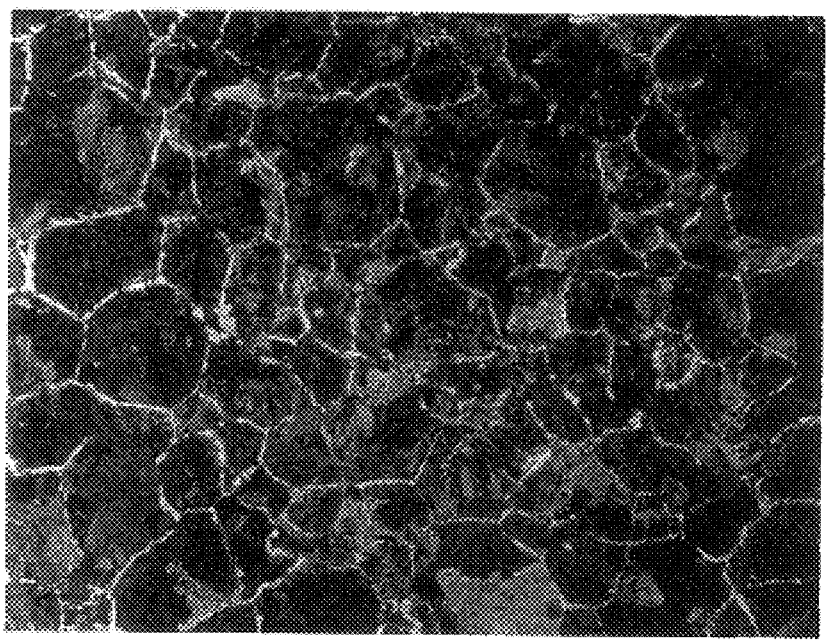

FIGS. 1 through 3 show an embodiment of the present invention. One of the characteristic features of the invention resides in a structure which prevents the deformation and wear of the respective parts and prevents part of the hub from being damaged, for example, cracked. Other structure than the above structure and a method of manufacturing the same are similar to those in the conventional technique shown in FIGS. 4 through 8. Therefore, description to follow will be given placing emphasis on the structure essential to the invention and those portions different from the conventional technique. Like reference numerals are used for indicating like or equivalent portions in FIGS. 4 through 8, for simplicity.

Figure 11:
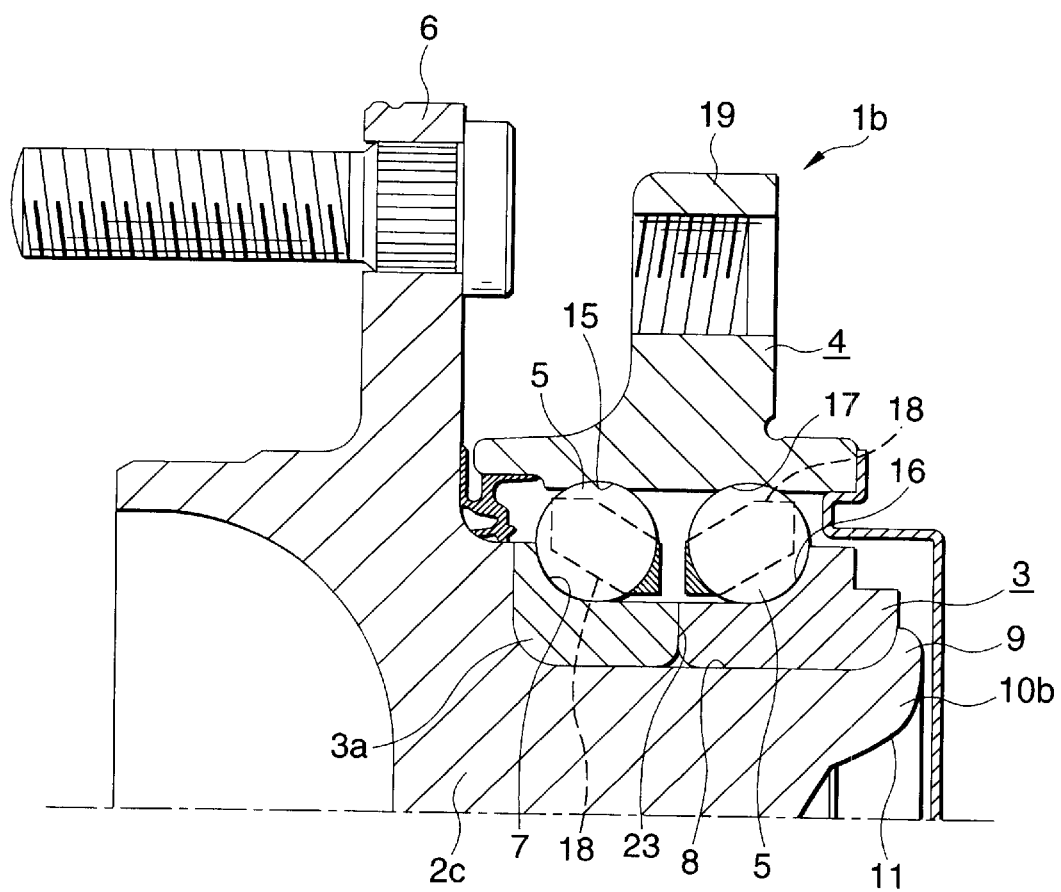
FIG. 11 is a cross sectional view showing a part of a wheel-support rolling bearing unit which is a modification of the embodiment of the present invention.

There is a modification of the above-mentioned embodiment that, as shown in FIG. 11, the first inner raceway 7 is formed in the outer peripheral surface of a separate inner ring 3a, which is fit to the middle of a hub 2c (as a hub body), while not directly and integrally formed in the outer peripheral surface of the middle portion of the hub 2c. In this modification, a portion of it, which is protruded inward in the axial direction, at the end of the hub 2c, beyond the inner ring of this separate inner ring, is used as a stepped part to which the inner ring 3 is fit.

A hub 2b (FIGS. 1 and 2), which forms a wheel-support rolling bearing unit 1a of the embodiment, is made of carbon steel. A surface portion (cross hatched in FIG. 1) of the hub including a stepped part 8 to which the inner ring 3 is fit is quenched to be hardened (hardness of this portion is increased to about Hv550 to 900). The quenched portion includes not only the half of the base end of the stepped part 8 but also a region ranging from the first inner raceway 7 portion to the base end portion of the first flange 6. A stepped part 25 is formed on the outer peripheral surface of a cylindrical portion 10b, which is provided on the inner end of the hub 2b, whereby the base end (the left side in FIGS. 1 and 2) of the cylindrical portion is large in diameter and the top end (the right side in FIGS. 1 and 2) of the cylindrical portion 10b is small in diameter. The stepped part 25 has a height H of about 0.02 to 0.12 mm. The stepped part 25 has a curved surface arcuate in cross section, and is smoothly continuous in shape to at least the small-diameter portion (the outer peripheral surface of a portion of the cylindrical portion 10b closer to its top end).

In the case of the hub 2b which forms the wheel-support rolling bearing unit 1a of the invention, crystal particles of the carbon steel of the cylindrical portion 10b portion (not quenched, and located on the right side of a chain line α in the figure) for forming a caulking portion 9, which is used for fastening the inner ring 3 to the hub 2b, are 0.012 mm$^2$ or smaller (it is 0.012 mm$^2$ in the FIG. 3A case) in an average cross sectional area before the caulking portion 9 is formed, as shown in FIG. 3A. The average cross sectional area of the crystal particles of the carbon steel, which forms the cylindrical portion 10b portion, is set to have a predetermined value by adjusting a time from an instant that the hub 2b is formed by forging till it is cooled down to normal temperature.

In the case of the hub 2b forming the wheel-support rolling bearing unit 1a of the instant embodiment, a portion of the cylindrical portion 10b, which extends from the stepped part 25 and beyond the same, is not quenched. The quenched portion, cross-hatched in FIG. 1, terminates a position closer to the base end of the cylindrical portion 10b than the stepped part 25 (close to the step surface 23 and the left side in FIGS. 1 and 2). Accordingly, the carbon steel, which forms the stepped part 25, and the middle portion and the portion closer to the top end of the cylindrical portion 10b, is in a green or half green state, and much softer than the quenched portion, cross hatched (its hardness is about Hv200 to 300).

In the wheel-support rolling bearing unit 1a thus constructed, the surface portion including the portion of the stepped part 8 located closer to its base end is hardened by quenching process. Accordingly, this surface portion is prevented from being deformed or damaged (e.g., worn). Further, in the embodiment, the stepped part 25 is provided on the outer peripheral surface of the cylindrical portion 10b, Therefore, when the cylindrical portion 10b is radially and outwardly expanded for caulking, damage, e.g., crack, is hardly formed in the expanded portion in the caulking work.

In this embodiment, the average cross sectional area of crystal particles, which form the cylindrical portion 10 to be the caulking portion 9, is selected to be within 0.012 mm$^2$. Therefore, formation of damage, e.g., crack, in the caulking portion 9 is effectively prevented when it is formed by radially outwardly expanding the cylindrical portion 10b. An experiment on this was conducted by the inventor. This will be described with reference to FIG. 3.

In the experiment, two types of samples (as being blank hubs) were used each consisting of 100 samples, totally 200 samples. In one type of samples, the crystal particles of the carbon steel forming the cylindrical portion 10b were 0.012 mm$^2$ in average cross sectional area, and in the other type of samples, those particles are 0.050 mm$^2$ in average cross sectional area. The cylindrical portion 10b was expanded for caulking for each sample. Inspection was made as to if the resultant caulking portions 9 of those samples have defects. No defect was found on all of those samples each having the average cross sectional area of 0.012 mm$^2$ (inspection passing rate=100%). 40% of the samples each having the average cross sectional area of 0.050 mm$^2$ were defective (passing rate=60%). It the experiment, it was confirmed that if the average cross sectional area of the crystal particles of the carbon steel of the cylindrical portion 10b is set to be small, a chance of making the caulking portion 9 defective is effectively eliminated.

The portion extending from the middle portion of the cylindrical portion 10b and beyond its top end, which is the portion extending from the stepped part 25 and beyond the same, is not quenched. Therefore, the portion extending from the stepped part 25 and beyond the same is more effectively prevented from being damaged, for example, cracked in the caulking expanding work. In other words, in the caulking expanding work, the stepped part 25 portion is reliably plastic-deformed radially outwardly, and will tightly contact with the inner peripheral surface of the inner ring 3. The operation and effects of this will be described with reference to FIG. 9.

Figure 4:
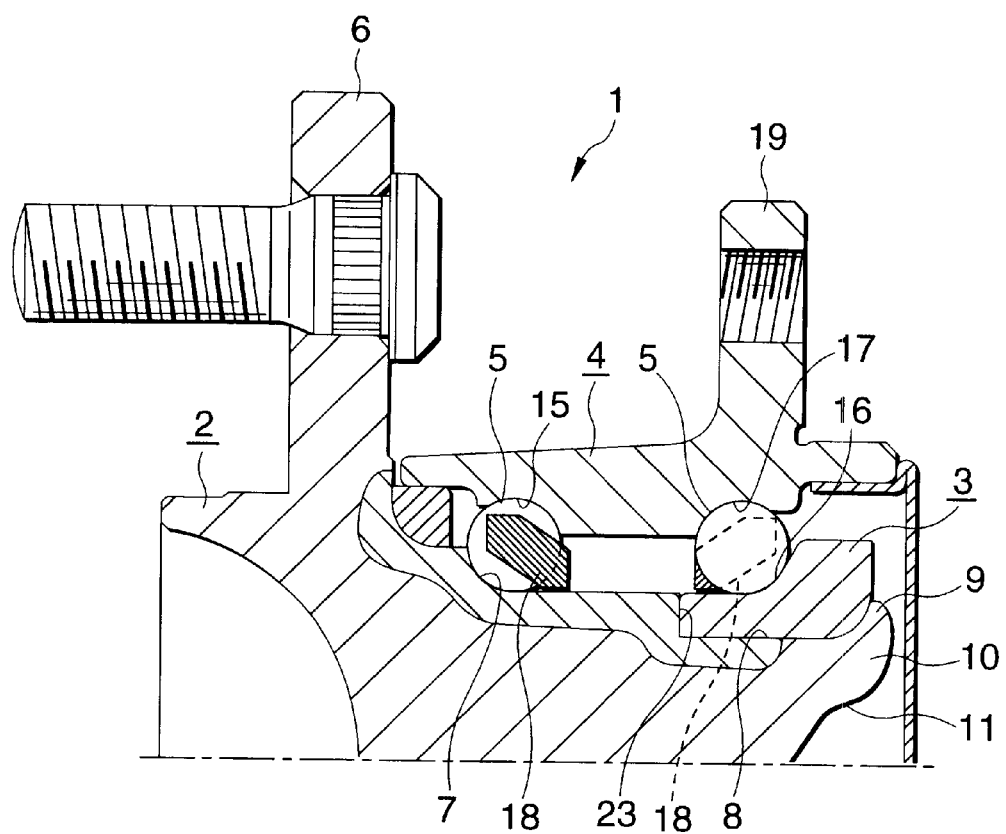
FIG. 4 is a cross sectional view partially showing a conventional wheel-support rolling bearing unit.
Figure 5:
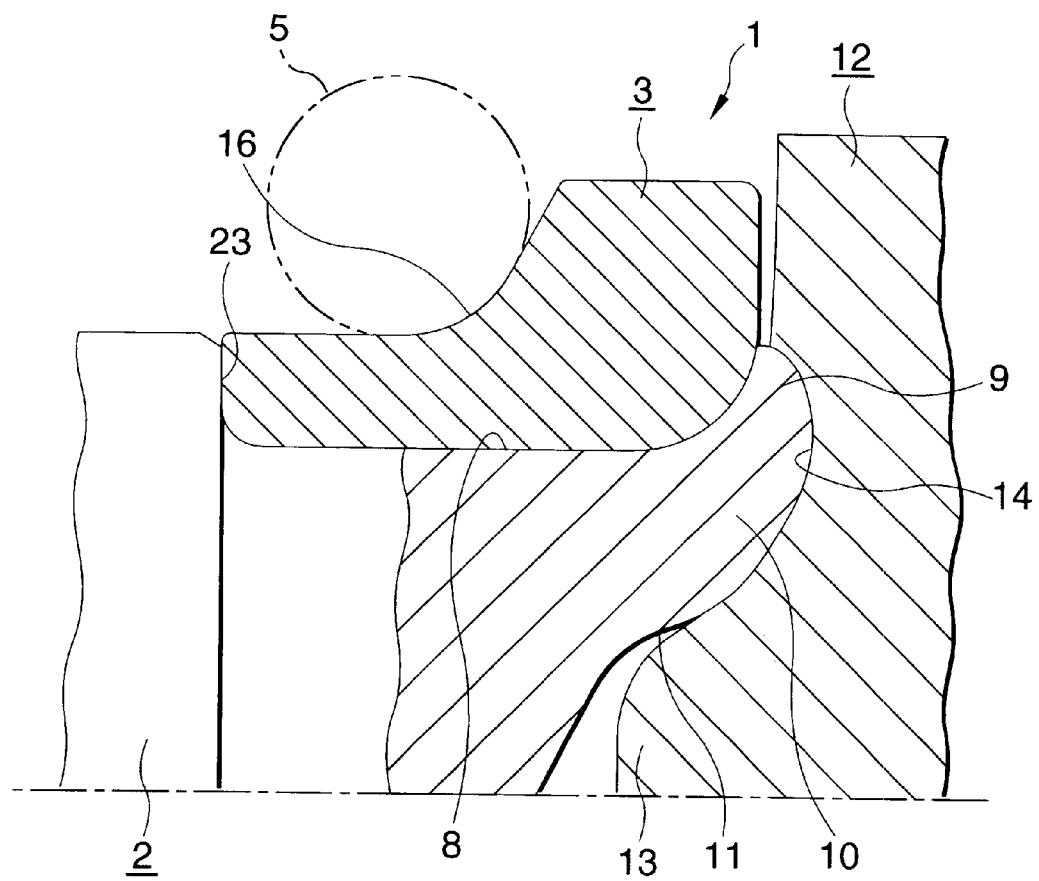
FIG. 5 is an enlarged, cross sectional view showing a state that the inner end of the hub is expanded for caulking in order to fix the inner ring in a first structure when it is manufactured.
Figure 6:
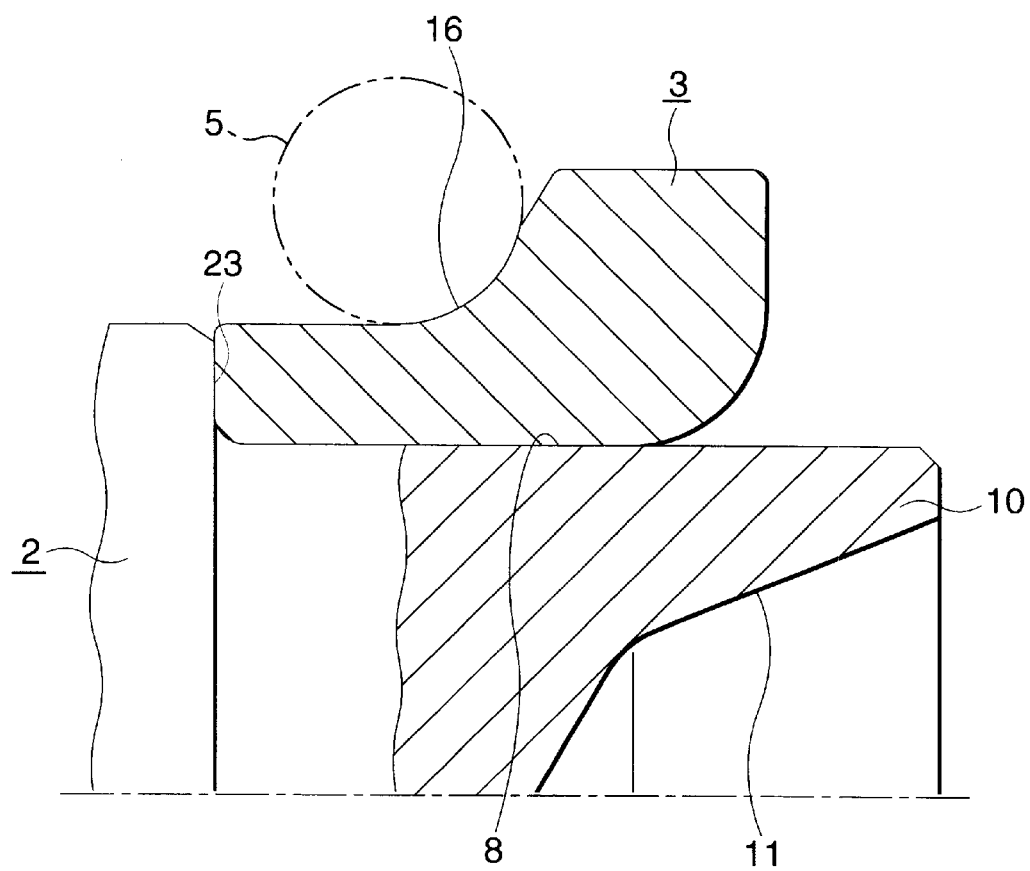
FIG. 6 is an enlarged, cross sectional view showing a part of the wheel-support rolling bearing unit before the inner end of the hub is expanded for caulking.
Figure 7:
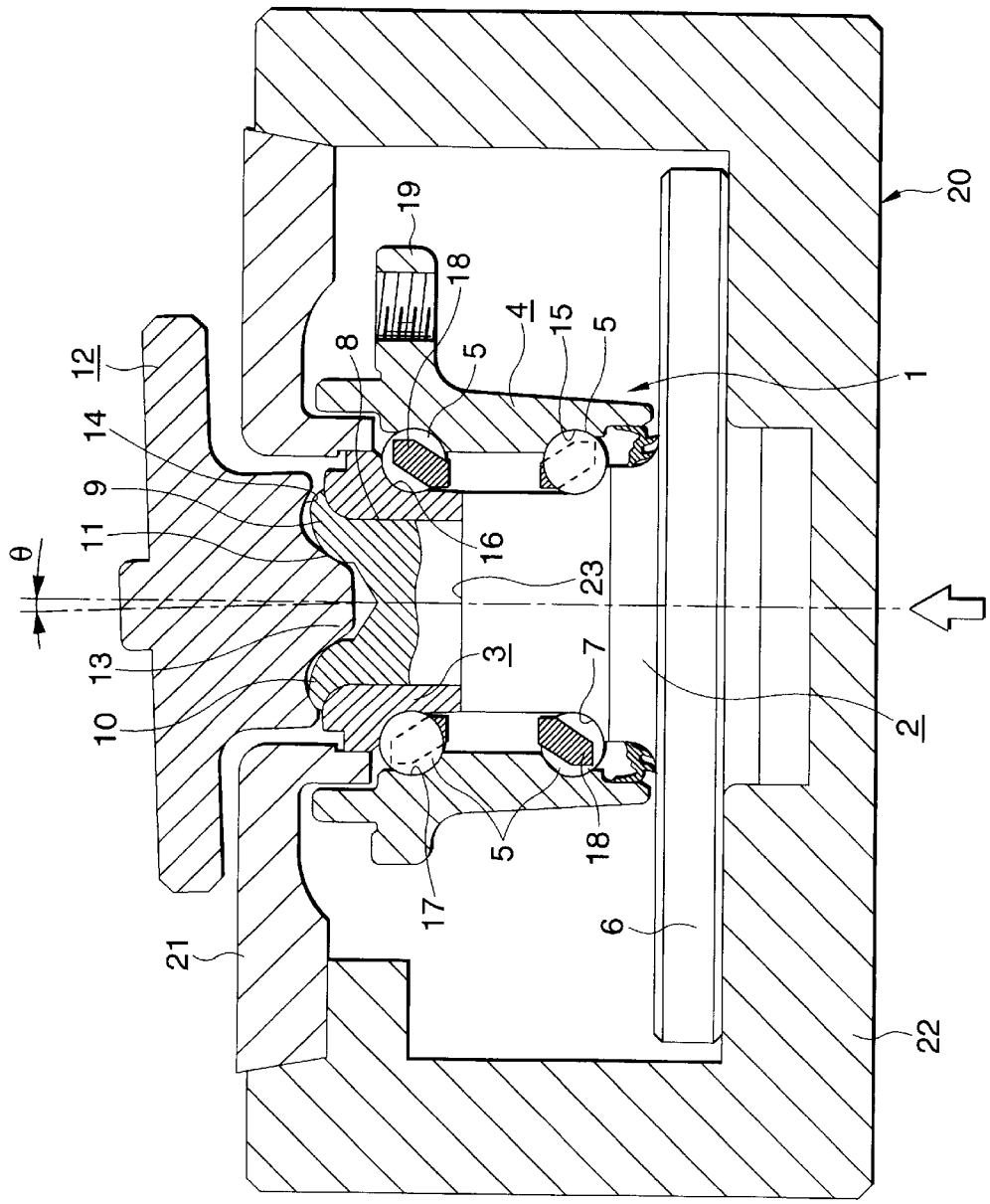
FIG. 7 is a longitudinal sectional view showing a key portion of the wheel-support rolling bearing unit and a state that the inner end of the hub is expanded for caulking by use of a swing press.
Figure 8:
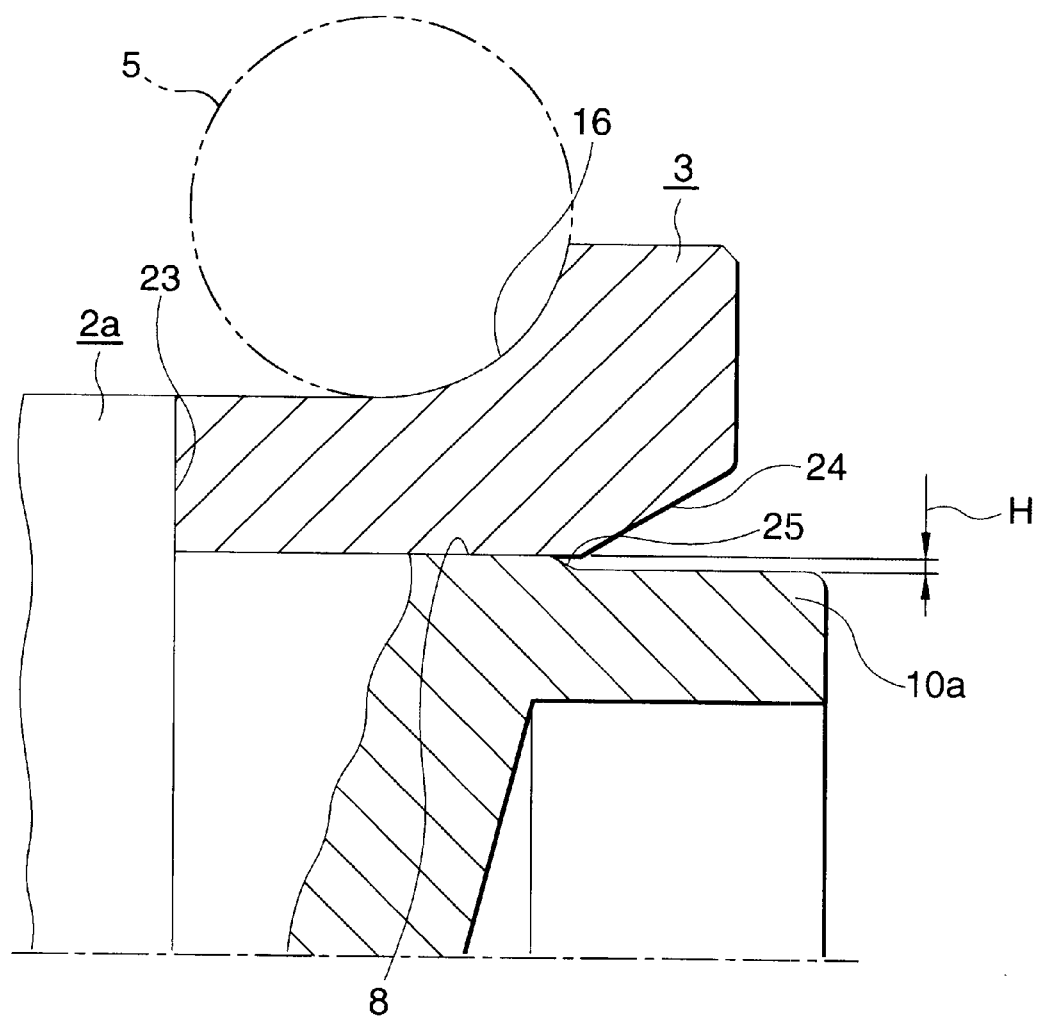
FIG. 8 is an enlarged, cross sectional view showing a part of a wheel-support rolling bearing unit which is another embodiment of the present invention.
Figure 9A:
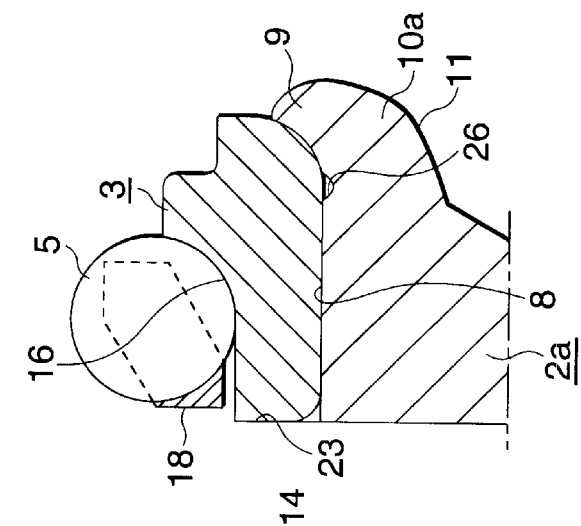
FIG. 9 shows a cross sectional view showing, in a sequence of manufacturing steps, how defect is caused in the caulking expanding work when a positional relationship between the stepped part and the portion to be quenched is improper.
Figure 9B:
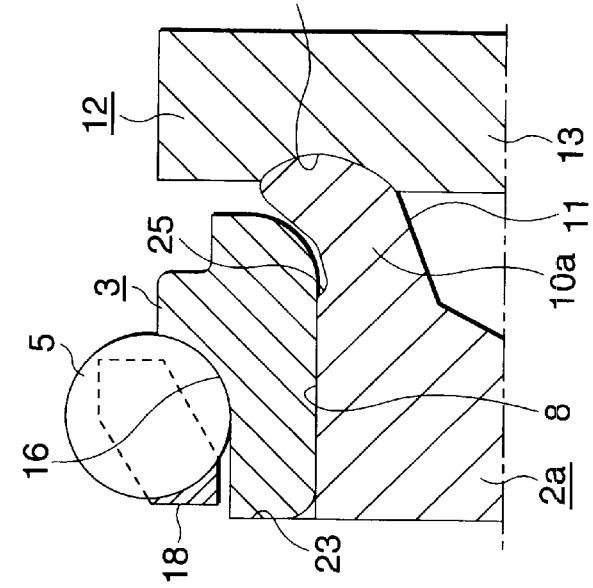
Figure 9C:
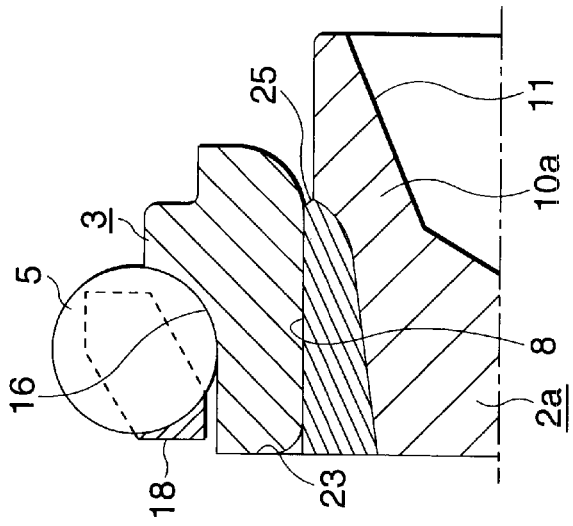

It is coupled with the first example of the conventional first structure shown in FIGS. 4 through 6, and the conventional second structure shown in FIG. 8, and the stepped part 25 formed on the outer peripheral surface of the cylindrical portion 10a is quenched. In this case, damage, e.g., crack, is likely to occur on the stepped part 25 when the cylindrical portion 10a is expanded outward in the diameter directions for caulking. Specifically, when the hardened layer, cross hatched in the figure, reaches to the stepped part 25 as shown in FIG. 9A, the stepped part 25 portion is hard to be plastic deformed when the cylindrical portion 10a is expanded for caulking as shown in FIG. 9B. As a result, a groove 26 is formed and left in the outer peripheral surface of the base end of the caulking portion 9 at a portion corresponding to the stepped part 25, as shown in FIG. 9C. Crack or the like is easy to be formed and its formation starts from the groove 26.

Turning to the embodiment, the stepped part 25 is not quenched. Therefore, the stepped part 25 is easy to be plastically deformed, so that the groove 26 as shown in FIG. 9C is not formed. Particularly, in the embodiment, the height H of the stepped part 25 is small, 0.12 mm. Accordingly, there is no chance of forming groove 26 which will cause the crack. Thus, the invention produces not only the cost reduction by decreasing the number of component parts but also the increase of production yield, which is caused by the reduction of a defective article rate in the manufacturing stage. As a result, the cost of manufacturing the wheel-support rolling bearing unit 1a is satisfactorily reduced.

Figure 10:
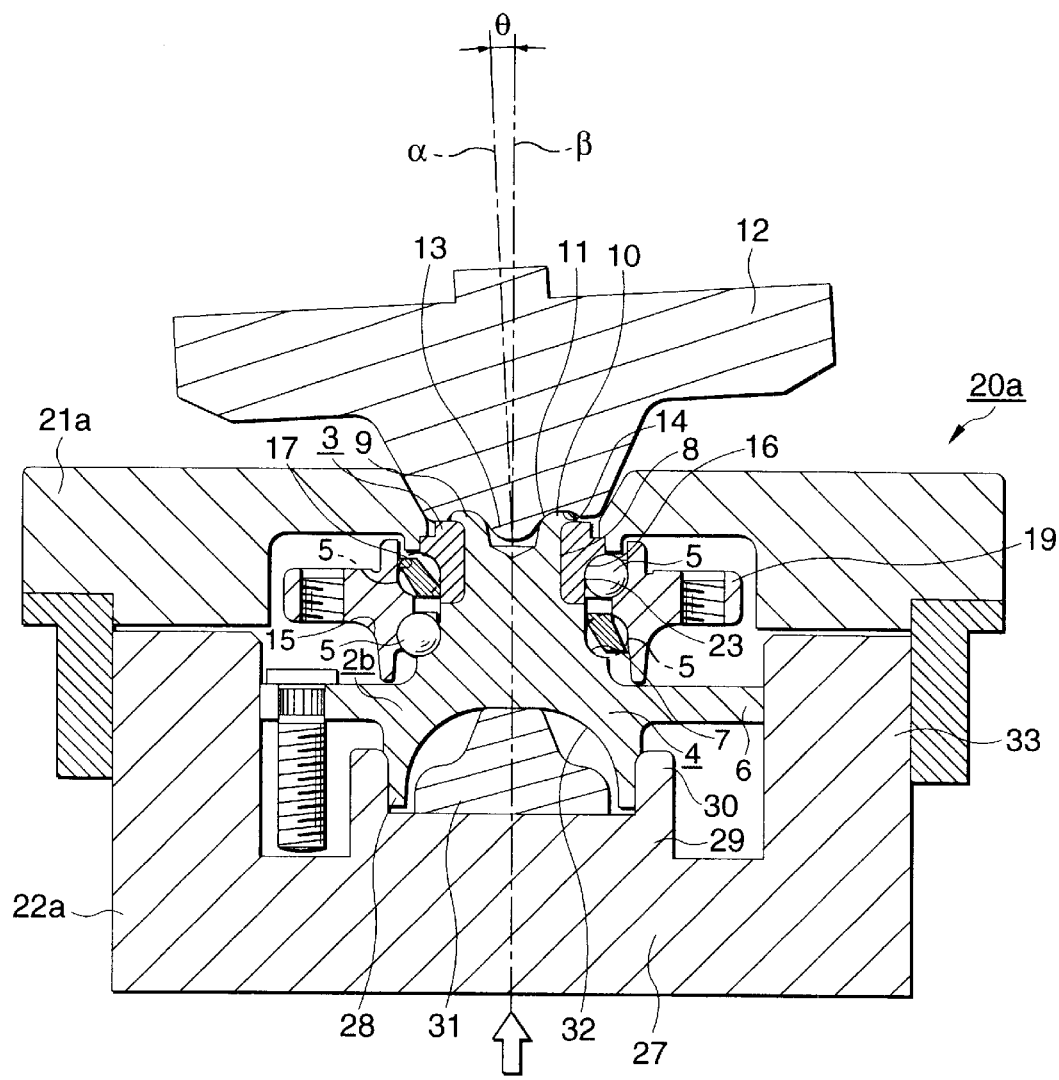
FIG. 10 is a longitudinal sectional view showing a key portion of the wheel-support rolling bearing unit and a state that the inner end of the hub is expanded for caulking by use of a swing press.

Hereinafter, an one example of a manufacturing method for a wheel-support rolling bearing unit according to the present invention will be explained with reference to FIG. 10. FIG. 10 shows a longitudinal sectional view showing a key portion of the wheel-support rolling bearing unit and a state that the inner end of the hub is expanded for caulking by use of a swing press. In FIG. 10, detailed descriptions, as to components or structures which are substantially equal to or functionally coincided with them shown in the aforementioned embodiment, are eliminated by utilizing the same reference numerals.

A more preferable work to form the caulking portion 9 will be described with reference to FIG. 10. A protruded support 29, circular in cross section, is provided at the central portion of the upper surface of a bottom plate 27 of the holder 22a, which forms a swing press 20a. A cylindrical guide 30 is formed along the circumference of the upper surface of the protruded support 29. A receiving tool 31 is placed within a space enclosed with the cylindrical guide 30.

The top end face (upper end face) of the receiving tool 31 is thrust against the recess end face of a recess 32, which is formed in the central portion of the outer end surface of a hub 2b. A cylindrical guide 28 to which a circular hole formed in the wheel as a vehicle wheel is fit is formed on the outer end surface of the hub 2b. The cylindrical guide 30 is provided within the cylindrical guide 28.

The inside diameter of the cylindrical guide 30 of the holder 22a is equal to or somewhat larger than the outside diameter of the cylindrical guide 28 of the hub 2b. The inside diameter of a peripheral wall 33 of the holder 22a is equal to or somewhat larger than the outside diameter of a first flange 6, which is formed along the peripheral surface of the outer end of the hub 2b. Accordingly, in a state that the hub 2b is set in the holder 22a in order to form the caulking portion 9 on and along the inner end of the hub 2b, the outer peripheral edge of the first flange 6 is located close to and confronted with the inner peripheral surface of the peripheral wall 33, and the outer peripheral surface of the cylindrical guide 28 is located close to and confronted with the inner peripheral surface of the cylindrical guide 30. And in this state, the top end face of the receiving tool 31 placed on the holder 22a is thrust against the recess end face of the recess 32, which is formed in the central portion of the outer end surface of the hub 2b.

The hub 2b is set to within the holder 22a, a holding tool 21a is fixed to the opening of the holder 22a, and the inner ring 3 and the hub 2b to which the inner ring 3 is fit are prevented from moving in the radial direction. In this state, the force piston 12 is displayed in a swing manner while pushing upward the holder 22a ( it is made to make a swing motion, like a precession, at an angle θ). The center axis α is inclined at θ with respect to the center axis B of the hub 2b. Accordingly, a part of the circumference of the force piston 12 is brought into contact with a part of the cylindrical portion 10 as viewed in the circumferential direction, which is formed on the inner end (upper end in FIG. 10) of the hub 2b. The cylindrical portion 10 is expanded for caulking in the radial direction while continuously moving this contact portion in the circumferential direction, whereby a caulking portion 9 as shown in FIG. 10 is formed.

When the caulking portion 9 is formed by expanding the cylindrical portion 10 in this way for caulking, a thrust load acting on the hub 2b, which is based on the mutual pressing of the force piston 12 and the cylindrical portion 10, is received by the holder 22a with the receiving tool 31 being interposed therebetween. It never happens that a large thrust load acts on the first flange 6, since the first flange 6, which is formed on the outer peripheral surface of the outer end of the hub 2b, is fit to the peripheral wall 33 in a state that it is displaceable in the axial direction. Accordingly, the outer surface of the first flange 6, which may serve as a mounting surface on which the wheel and the disc rotor are mounted after the caulking portion 9 is formed on the inner end of the hub 2b by the swing caulking, will not be inclined with respect to a phantom plane, which is orthogonal to the center axis of the hub 2b.

For this reason, if a required mounting accuracy of the first flange 6 to the outer surface of the first flange 6 and the disc rotor is secured, both side surfaces of the disc rotor will not be inclined with respect to the phantom plane, which is orthogonal to the center axis of the hub 2b. Therefore, the judder, which occurs when the vehicle running at high speed is braked, can be reduced to zero or considerably reduced.

With regard to the judder, if the outer surface of the first flange 6 is inclined and both the side surfaces of the disc rotor mounted on this outer surface is inclined with respect to the phantom plane, which is orthogonal to the center axis of the hub 2b, a violent vibration, called judder, occurs when the vehicle running at high speed is braked. Such a vibration makes the driver uncomfortable, and accordingly, should be avoided.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As seen from the foregoing description, the present invention is constructed and operated as described above, the invention provides a wheel-support rolling bearing unit which is low in weight and cost, and excellent in durability.

What is claimed is:

1. A wheel-support rolling bearing unit comprising:
   an outer ring having first and second outer raceways formed on its inner peripheral surface;
   a hub made of carbon steel, said hub having a flange formed on the outer peripheral surface of one end thereof, said hub having a first inner raceway which is disposed on its middle portion in an axial direction thereof and is confronted with said first outer raceway of said outer ring, said hub having a cylindrical portion which is disposed at the other end of said hub and has first and second portions, wherein an average cross sectional area of crystal particle in said second portion is less than 0.030 mm$^2$;
   an inner ring provided at the other end of said hub, said inner ring having a second inner raceway which is formed on its outer peripheral surface and is confronted with said second outer raceway of said outer ring;
   a plurality of first rolling elements located between said first inner raceway and said first outer raceway; and
   a plurality of second rolling elements located between said second inner raceway and said second outer raceway;
   wherein a caulking portion, which is formed by plastically deforming said second portion of said cylindrical portion, is protruded beyond at least the inner ring fit to said hub, whereby said inner ring fit to said hub is firmly coupled to said hub.

2. The wheel-support rolling bearing unit according to claim 1, wherein said hub comprises:
   a main body integrally formed with said flange portion; and
   a separate inner ring which has said first inner raceway and is fit to said main body.

3. The wheel-support rolling bearing unit according to claim 2, wherein an average cross sectional area of the crystal particles in said second portion is less than 0.0156 mm$^2$.

4. The wheel-support rolling bearing unit according to claim 2, wherein an average cross sectional area of the crystal particle in said second portion is less than 0.020 mm$^2$.

5. The wheel-support rolling bearing unit according to claim 1, wherein an average cross sectional area of the crystal particles in said second portion is less than 0.0156 mm$^2$.

6. The wheel-support rolling bearing unit according to claim 1, wherein an average cross sectional area of the crystal particle in said second portion is less than 0.020 mm$^2$.

7. The wheel-support rolling bearing unit according to claim 1, wherein an average cross sectional area of the crystal particle in said second portion is less than 0.012 mm$^2$.

8. The wheel-support rolling bearing unit according to claim 2, wherein an average cross sectional area of the crystal particle in said second portion is less than 0.012 mm$^2$.

* * * * *